United States Patent

Dyes et al.

Patent Number: 5,408,317
Date of Patent: Apr. 18, 1995

[54] SCATTERED LIGHT MOIRE-BRILLOUIN GYROSCOPE

[75] Inventors: William A. Dyes, Haverhill; Farhad Hakimi, Watertown, both of Mass.

[73] Assignee: The Charles Stark Draper Laboratory, Inc., Cambridge, Mass.

[21] Appl. No.: 636,080

[22] Filed: Dec. 28, 1990

[51] Int. Cl.⁶ .................. G01B 9/02; H01S 3/083
[52] U.S. Cl. ......................... 356/350; 372/6; 372/94
[58] Field of Search ............. 356/350; 372/6, 94

[56] References Cited

U.S. PATENT DOCUMENTS

| | | | |
|---|---|---|---|
| 3,941,481 | 3/1976 | Kramer | 356/350 |
| 4,107,628 | 8/1978 | Hill et al. | 372/94 |
| 4,159,178 | 6/1979 | Vali et al. | 356/350 |
| 4,530,097 | 7/1985 | Stokes et al. | 372/3 |
| 5,064,288 | 11/1991 | Dyes et al. | 356/350 |

Primary Examiner—Stephen C. Buczinski
Attorney, Agent, or Firm—Iandiorio & Teska

[57] ABSTRACT

A scattered light Moire-Brillouin guided wave gyroscope includes a coherent light source for providing two counter-rotating primary waves; an optical waveguide, responsive to the two primary waves, for generating a Moire fringe from a primary fringe and a Brillouin fringe derived respectively from the counter-rotating primary waves and from the counter-rotating Brillouin waves produced from the primary waves; and means for detecting the rotation of the Moire fringe relative to the waveguide.

17 Claims, 4 Drawing Sheets

SCATTERED LIGHT MOIRE-BRILLOUIN GYROSCOPE

FIELD OF INVENTION

This invention relates to an optical gyroscope which uses multiple Brillouin waves to create a Moire fringe whose relative motion can be sensed from scattered light emanating from the side of the fiber optic element.

BACKGROUND OF INVENTION

There are a number of conventional available optical gyroscopes. Resonant fiber optic gyroscopes (RFOGs) operate by recirculating a laser beam a number of times in each direction in a fiber optic ring. When the gyroscope is steady, the two counter-rotating beams are resonant at the same frequency. When the gyroscope moves the resonant conditions change so that each beam has a different resonant frequency. The difference between these shifted frequencies is a measure of gyroscope rotation rate. RFOGs require sophisticated electronics to measure this rotation rate which must be further processed to obtain the actual rotational angle. Drift caused by backscattering and other error sources requires further sophisticated electronic processing.

Interferometer fiber optic gyroscopes (IFOGs) also use two counter-rotating laser beams but they just circulate once in the fiber optic ring. The two beams create an interference pattern. The variation of the intensity of the fringes of the interference pattern represent the phase shift due to the movement of the gyroscope. Since the beams make only one circuit of the ring, a long length of fiber optic element, a kilometer or more, is required and such elements are expensive. This system also requires sophisticated electronics to process the phase shift signal in order to obtain a measure of gyroscope rotation rate which must be further processed to obtain the rotation angle.

Ring laser gyroscopes (RLGs) also circulate two laser beams in opposite directions around a laser cavity. When the ring is stationary the beams oscillate at the same frequency. When the ring rotates the beam frequencies diverge and the difference in frequency is a function of the gyroscope rate of motion. Backscattering in RLGs causes locking problems which result in non-linear responses at low gyroscope rotation rates and must be compensated for by, for example, dithering the gyroscope and employing additional electronics to accommodate the dither. RLGs require costly, precision optics for the cavity and the mirrors to minimize backscattering and require high voltage to drive the HeNe laser source.

There is also a new proposed multi-Brillouin wave fiber optic gyroscope which uses the inherent dynamics of the waveguide to demodulate two moving fringes each derived from a pair of Brillouin waves to create a stationary fringe or inertial standing wave whose motions relative to the waveguide can be sensed by means of the scattered light from the sides of the waveguide.

SUMMARY OF INVENTION

It is therefore an object of this invention to provide an improved fiber optic gyroscope which is simpler, less expensive and more reliable than conventional fiber optic gyroscopes.

It is a further object of this invention to provide such an improved gyroscope which provides a direct readout of rotation angle as compared with conventional fiber optic gyroscopes.

It is a further object of this invention to provide such an improved gyroscope which obtains extremely high resolution without complex, sophisticated and expensive signal processing as compared to conventional gyroscopes.

It is a further object of this invention to provide such an improved gyroscope which can avoid the problems associated with backscattering in conventional gyroscopes.

It is a further object of this invention to provide such an improved gyroscope which requires only small, low-power laser sources and relatively short lengths of fiber optic elements compared to conventional gyroscopes.

It is a further object of this invention to provide such an improved gyroscope which uses even less power than the recent improved multi-Brillouin wave gyroscope.

The invention results from the realization that an extremely simple, reliable optical gyroscope can be made by using the inherent dynamics of the waveguide to demodulate two fringes, one created from a pair of counter-rotating primary coherent waves, the other created from a pair of counter-rotating Brillouin waves which are in turn derived from the primary waves, to create a Moire fringe whose motion relative to the waveguide can be sensed by means of the scattered light from the sides of the waveguide.

This invention features a scattered light Moire-Brillouin guided wave gyroscope including a coherent light source for providing two counter-rotating primary waves. An optical waveguide is responsive to the two primary waves for generating a Moire fringe from a primary fringe and a Brillouin fringe. The primary fringe is derived from the combination of the two counter-rotating primary waves. The Brillouin fringe is derived from two Brillouin waves which in turn have been derived from the two counter-rotating primary waves. The Brillouin waves themselves are counter-rotating with respect to each other and with respect to the primary waves which generated them. There are means for detecting the rotation of the Moire fringe relative to the waveguide.

In a preferred embodiment the primary waves are of the same frequency, and the primary fringes are stationary in the rest position of the gyro. Alternatively, the primary waves may be separated in frequency by a multiple of the free structural range of the waveguide. In that case the Brillouin fringe and the primary fringe are moving in the rest position of the gyro.

The coherent light source may be a laser. The laser may be a solid state laser. The optical waveguide may be a fiber optic element. The means for detecting may include a sensor proximate the side of the waveguide for sensing a shift in the Moire fringe relative to the waveguide. It may also include a plurality of sensors disposed proximate the side of the waveguide for sensing relative motion of the Moire fringe. The sensors may extend along the waveguide for monitoring a plurality of fringes of the Moire fringe and there may be a number of sensors disposed adjacent each Moire fringe cycle along the waveguide.

The sensors may include an array of CCDs. The means for detecting may include means for determining the magnitude of the motion of the Moire fringe relative to the waveguide and means for determining the direction of relative motion between the waveguide and the Moire fringe.

The light source may include a single laser and there may be frequency shifter means for separating the primary waves by a multiple of the free spectral range of the waveguide.

DISCLOSURE OF PREFERRED EMBODIMENT

Other objects, features and advantages will occur to those skilled in the art from the following description of a preferred embodiment and the accompanying drawings, in which.

Figure 1:
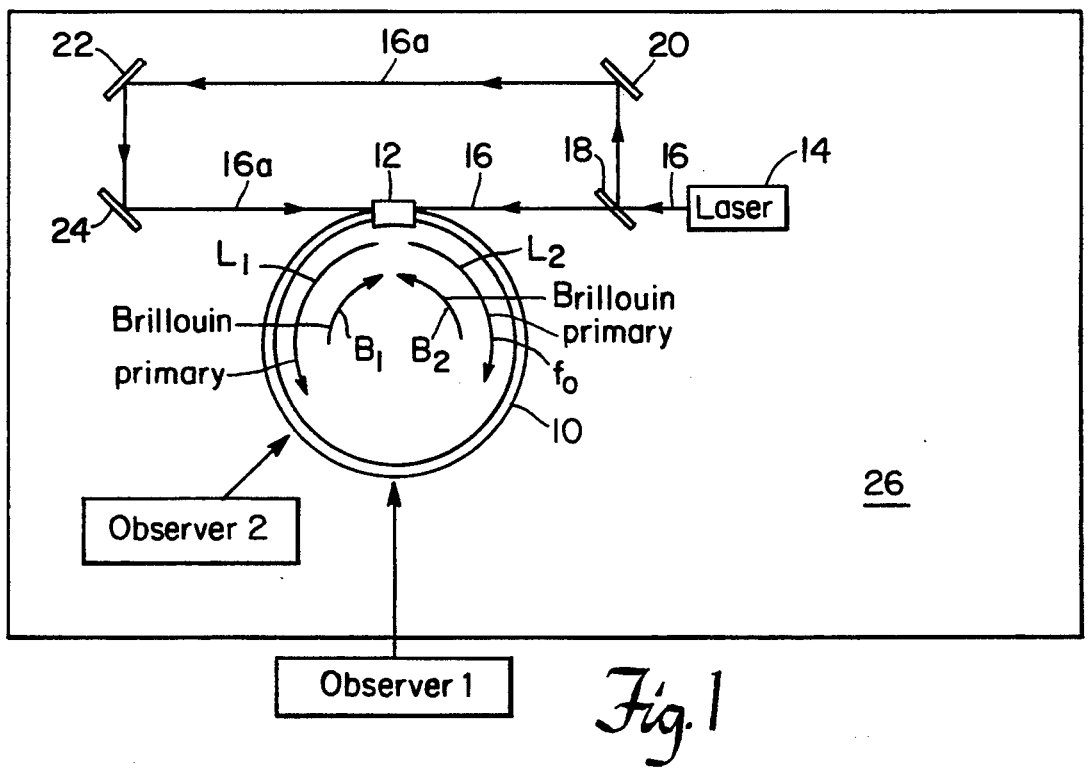
FIG. 1 is a schematic diagram of the laser driven optical waveguide in which the primary fringe, Brillouin fringe, and Moire fringe are created.

One of the important advantages of this invention is that it uses scattered light to detect rotation. Another is that it utilizes intrinsic non-linearity from the optical fiber together with the scattered light to bypass a great deal of electronics used in conventional optical gyros. The nonlinear property of the fiber utilized is Stimulated Brillouin Scattering (SBS) which can generate one or more optical waves when sufficient optical power is coupled to the core of the fiber optic element. The Brillouin threshold in high-finesse fiber optical resonator cavities can be as low as a few tens of microwatts. One embodiment of this invention utilizes the Brillouin phenomenon in a high-finesse fiber cavity to generate two counter-rotating Brillouin waves from two counter-rotating primary coherent waves from a laser. The two primary waves combine to form a primary fringe, $P_f$, which is non-inertial; the two counter-rotating Brillouin waves produce a Brillouin fringe, $B_f$, which is inertial. By inertial is meant that the conduct in space of the fringe is not affected by the motion of the waveguide. If the fringe is moving it remains moving; if it is stationary, it remains stationary regardless of the motion of the waveguide. The two fringes, $B_f$ and $P_f$, combine to form the Moire fringe, $M_f$ from which the rotation angle can be determined through the observation of the Moire scattered light at the side of the fiber optic element.

Gain can be induced in a high-finesse fiber ring resonator by exciting the ring with sufficient power from a continuous-wave, narrow line width laser source. The counter-rotating waves are generated through the nonlinear optical process SBS. SBS occurs in the optical fibers when the optical field becomes sufficiently strong. This occurs when the laser frequency is tuned to the resonance of the fiber optic loop. The initial optical field is scattered by an acoustic wave that occurs naturally in the fiber and can be thought of as a traveling index grating. The backscattered light from the acoustic wave experiences a frequency shift, like a Doppler shift, from the original optical field because the acoustic waves are moving. The scattered light mixes with the original laser light to produce its own acoustic wave through electrostriction effects. This in turn scatters more light from the original laser beam. More scattered light leads to more acoustic waves and the process progresses to produce more frequency-shifted Brillouin light waves from the original laser source. If the laser source is tuned to the resonance of a fiber cavity, the optical field builds up and the nonlinear process of SBS induces a gain at the Brillouin frequency. When the gain at the Brillouin shifted light frequency has exceeded the loss of the cavity, laser action occurs at the Brillouin frequency. The Brillouin laser action occurs in the opposite direction to the original laser source because it was generated by a backscattered portion of the scattered radiation. The frequency shift of the new laser line is given by the expression $f = 2 Vn/\lambda$, where V is the velocity of sound in the fiber, typically 6 km/s, n is the index of refraction, typically 1.5, and $\lambda$ is the wavelength of the original laser light.

For a laser light of 1.3 microns the Brillouin frequency is about 13.8 GHz. The threshold for the Brillouin laser action can be in the tens of microwatts for high-finesse fiber cavities.

The scattered light from the Moire fringe created from the Brillouin fringe and primary fringe can be used to implement a unique fiber optical waveguide gyroscope. If a narrow line width laser is tuned to the resonance of a high-finesse cavity with power sufficient to generate two Brillouin laser lines introduced in opposite directions in the waveguide, the two oppositely circulating primary laser waves generate a pair of counter-rotating Brillouin waves which are also circulating in opposite directions to each other. The pair of oppositely rotating primary waves create the primary fringe $P_f$, the pair of oppositely rotating Brillouin waves create the Brillouin fringe, $B_f$. These two fringes combine to form the Moire fringe whose motion indicates the direction and magnitude of the motion of the waveguide or gyroscope.

The Moire pattern moves in the direction of motion of the fringe which appears to the observer to be moving. Therefore an "offboard" observer sees the $B_f$ fixed and sees the $P_f$ move with the waveguide so the Moire fringe $M_f$ moves in the direction of motion. To the onboard observer the $P_f$ seems fixed because it is moving with him; thus the $B_f$ which is fixed appears to be moving in the opposite direction of motion and so the $M_f$ moves with the apparently moving fringe, the $B_f$. Thus the Moire moves in the opposite direction of real motion.

In summary, when the ring is not moving, both $B_f$ and $P_f$ appear fixed. When the ring is moved $B_f$ appears fixed to the offboard observer and moving to the onboard observer. When the ring is moved $P_f$ appears moving to the offboard observer and fixed to the observer.

There is shown in FIG. 1 an optical waveguide 10 in the form of a ring which is driven through a coupler 12 by light from laser 14. The laser light 16 moving in the direction L1 creates Brillouin wave $B_1$ circulating in the opposite direction. The laser beam 16 is split by beamsplitter 18 and directed such as by mirrors 20, 22 and 24, around to the other side of coupler 12 as beam 16a, where it is circulated as primary wave $L_2$ in the other direction around ring 10. Laser wave $L_2$ generates counter-rotating Brouillin wave $B_2$. Brillouin waves $B_1$ and $B_2$ are inertial, that is, they maintain their own position in space independent of ring 10. If observer 2 on platform 26 could see them they would appear to move if ring 10 were moved, while observer 2 would think that ring 10 had not moved. In contrast, "offboard" observer 1 would see that the Brillouin waves are fixed in space and do not move; rather, it is the ring 10 which is moving relative to the Brillouin waves $B_1$ and $B_2$. The resulting fringe pattern $B_f$ generated by Brillouin waves $B_1$ and $B_2$ is likewise inertially independent of ring 10. In contrast, the primary waves $L_1$ and $L_2$ are not inertial. The onboard observer 2 and offboard observer would perceive primary waves $L_1$ and $L_2$ oppositely to their perception of the Brillouin waves $B_1$ and $B_2$. The fringe $P_f$ resulting from the primary waves $L_1$ and $L_2$ is, like the waves $L_1$ and $L_2$ that created it, likewise non-inertial. The laser beam 16 has a frequency $F_0$ of 200 THz. The Brillouin waves each have a frequency 13.8 GHz below $F_0$, or 199.9862 THz.

Figure 2:
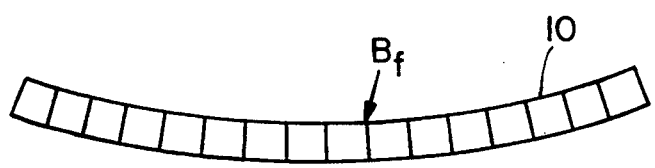
FIG. 2 is a schematic diagram of a portion of the waveguide of FIG. 1 illustrating the Brillouin fringe.
Figure 3:
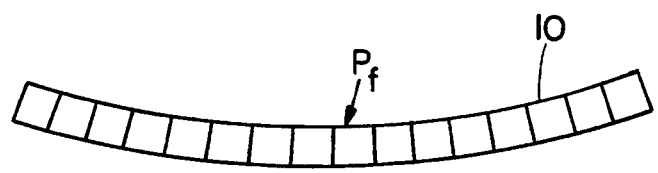
FIG. 3 is a schematic diagram of a portion of the waveguide of FIG. 1 illustrating the primary wave fringe.
Figure 4:
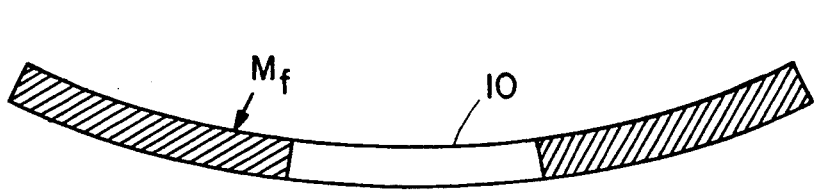
FIG. 4 is a schematic diagram of a portion of the waveguide of FIG. 1 illustrating the Moire fringe.
Figure 5:
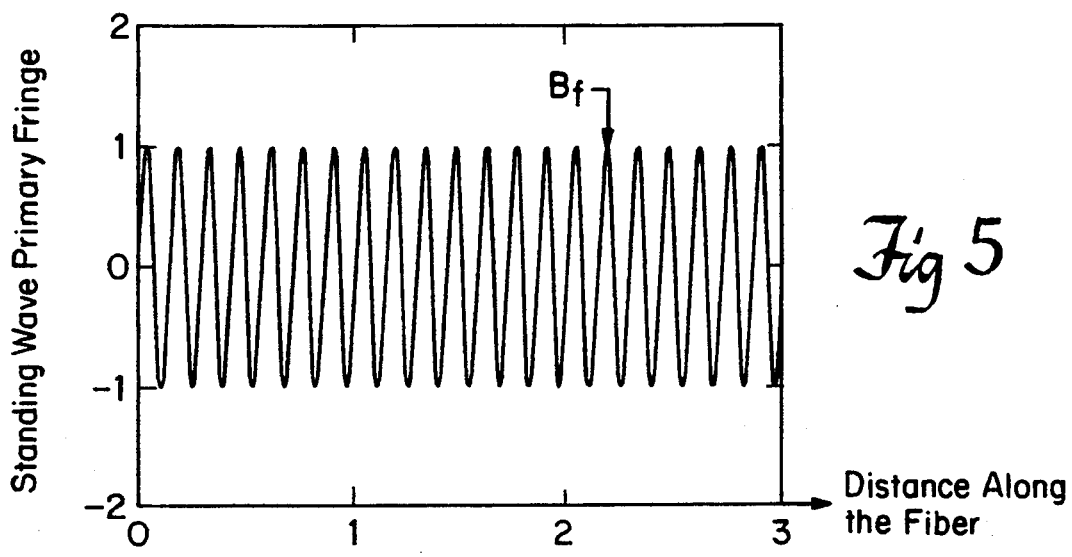
FIG. 5 illustrates the waveform of the primary wave fringe.
Figure 6:
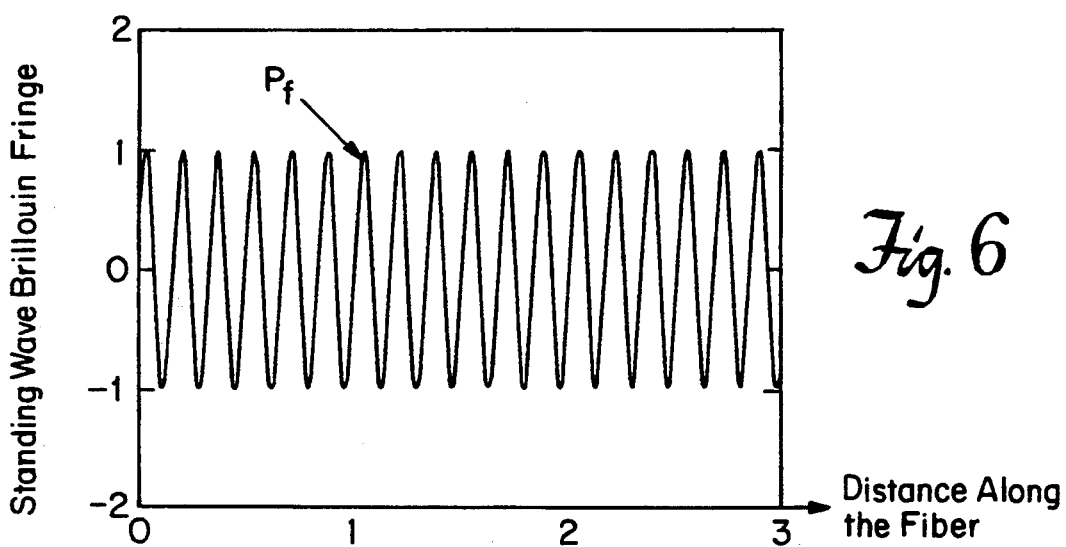
FIG. 6 illustrates the waveform of the Brillouin fringe.
Figure 7:
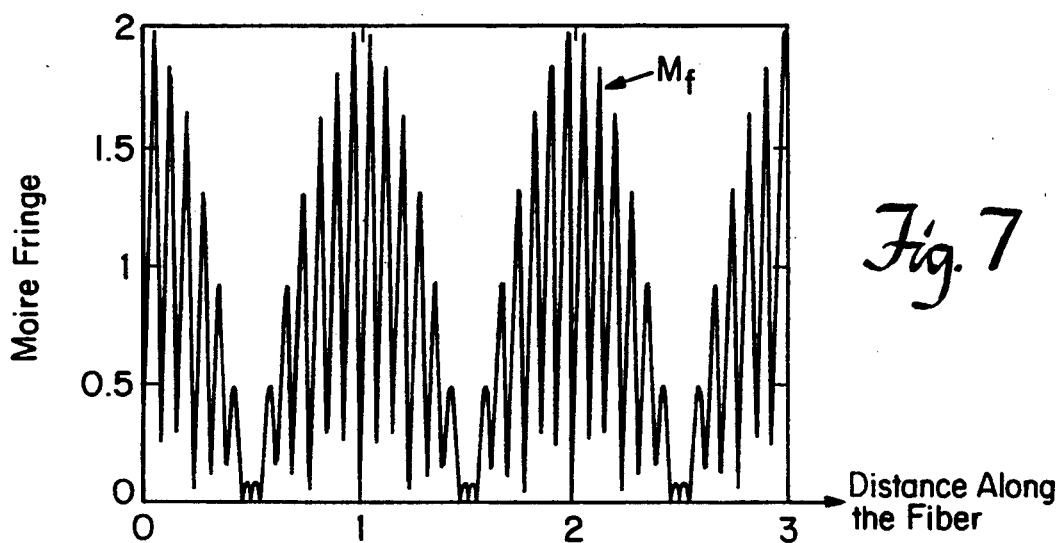
FIG. 7 illustrates the waveform of the Moire fringe.

Brillouin fringe $B_f$, FIG. 2, has fringes of approximately 0.5 micron in width. The primary fringe $P_f$, FIG. 3, has fringes that are approximately the same size, that is, about 0.5 micron, but actually about 1/20,000 smaller than the Brillouin fringe. This small difference causes the two fringes $B_f$ and $P_f$ to beat together and form the Moire fringe $M_f$, FIG. 4, which is quite large, on the order of 1 mm, and easily detectable, to indicate the direction of motion and magnitude of motion. The Brillouin fringe is depicted more conventionally in FIG. 5, the primary fringe $P_f$ in FIG. 6, and the resulting Moire pattern $M_f$ is shown in FIG. 7.

Figure 8:
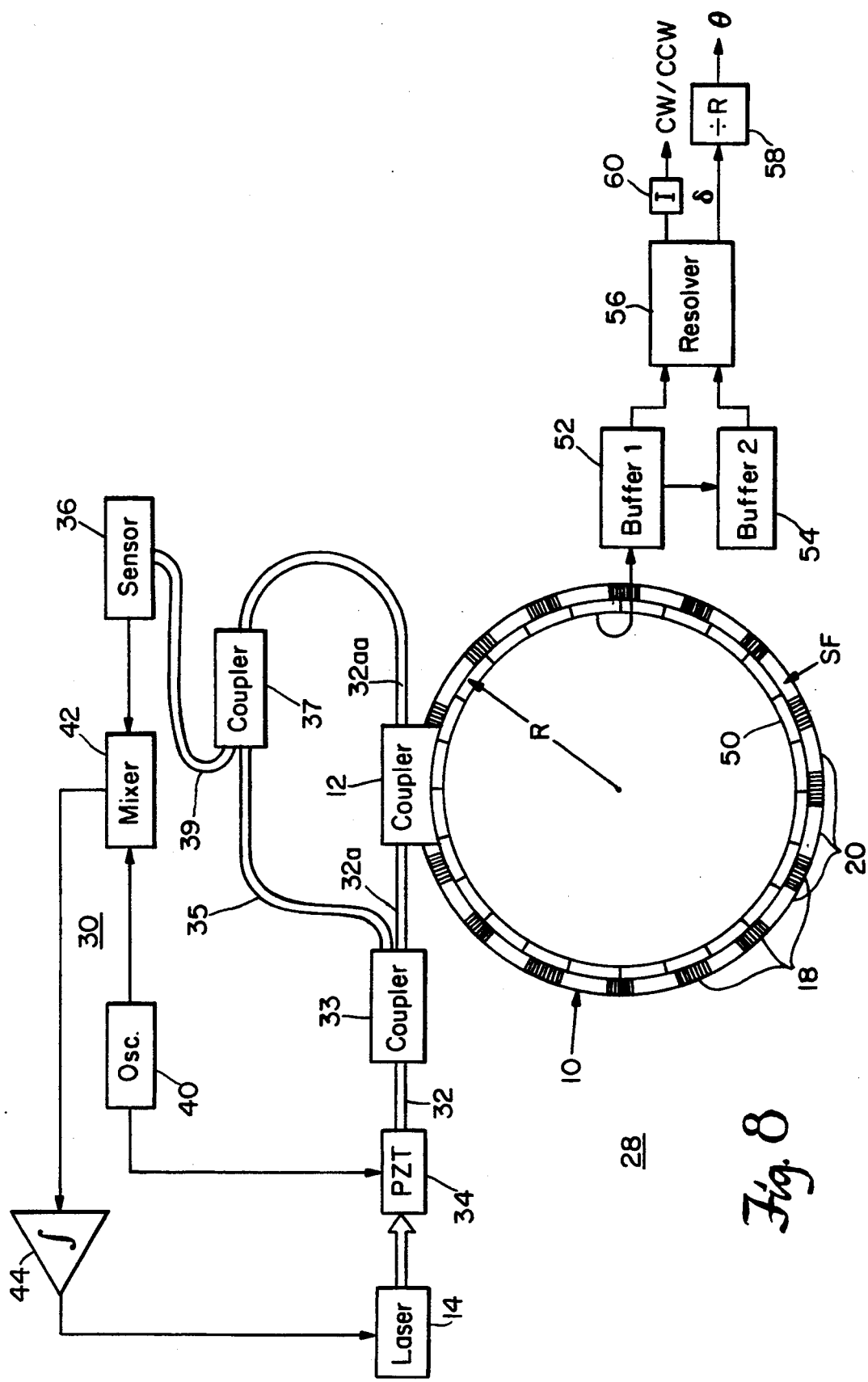
FIG. 8 is a more detailed schematic diagram of an optical waveguide with a plurality of sensors and functioning as a gyroscope according to this invention.

A gyroscope system 26, FIG. 8, may be constructed according to this invention using a resonant laser lock circuit 30 to lock the laser frequency to the resonant frequency of waveguide 10. Resonant laser lock circuit 30 includes a piezoelectric phase modulator 34 which modulates the frequency of the light beam from laser 14 and provides a beam of adjusted frequency or wavelength from fiber optic element 32 to coupler 33. The output from coupler 33 is fed on fiber optic element 32a to coupler 12 which in turn couples the primary wave into waveguide 10. Coupler 33 also redirects the primary laser wave on fiber optic element 35 to coupler 37. From coupler 37, the primary wave is delivered on fiber optic element 32aa to coupler 12 to form the other of the two counter-rotating primary waves in waveguide 10. Sensor 36 receives light from coupler 37 over fiber optic element 39. The signal representing the frequency or wavelength of the light sensed by sensor 36 is beat or mixed in mixer 42 with the signal representing the frequency of oscillator 40 which drives piezoelectric phaser modulator 34. Any difference between the two is integrated in amplifier 44 and fed back to drive laser 14. Any divergence between the two frequencies apparent in mixer 42 is used to vary the frequency of oscillation of oscillator 40 to drive integrator 44 to adjust the frequency and wavelength of the laser being propagated on optical element 32 to couplers 33 and via coupler 33 to coupler 12 at waveguide 10.

The scattered light output from waveguide 10 can be sensed by a series of sensors 50 such as an array of CCDs which are positioned alongside at least a portion of waveguide 10. The sensors may be sized so that there is more than one sensor per fringe cycle in order to increase resolution. The output from sensors 50 is delivered to a first buffer 52. The contents of buffer 52 are periodically delivered to buffer 54. By comparing the contents of the two buffers, resolver 56, which can be a typical resolver such as a microprocessor used with conventional encoders, produces a signal which indicates the direction of relative motion, CW/CCW, of Moire fringe $M_f$ with respect to sensors 50. Resolver 56 also indicates the magnitude of the relative motion which when divided by the radius R in divider circuit 58 renders the rotation angle. Since, when observed by an onboard observer such as sensor 50, the Moire fringe moves in the direction opposite to true motion, an inverter 60 is introduced at the output of resolver 56 to convert the output to the correct direction.

Typically, laser 14 provides light of 1.3 microns, approximately 200 TerraHz. Waveguide 10 may be 20 meters in length wound on a three-inch spool. The first Brillouin wave $B_1$ and $B_2$ occur at 200 TerraHz less the Brillouin frequency of 13.8 MHz or 199.9862 TerraHz.

Backscattering of the Rayleigh type can cause coupling of the two Brillouin waves which at low frequency makes the $B_f$ non-inertial and disables the device.

To overcome this coupling, the frequency of the two Brillouin waves is separated by the same multiple of the free spectral range as expressed by C/nL, where C is the speed of light, n is the index of refraction of the ring, and L is the length of the ring.

For example, a 20 m fiber has a 10 MHz free spectral range. By shifting the laser input so that $f_o$ is, for example, 200 TerraHz, the other laser frequency $f_o + f_{FSR}$ is equal to 200 TerraHz plus 10 MHz. Therefore $B_1$ equals 199.9862 THz and $B_2$ equals 199.9862 THz + 10 MHz.

This results in a moving $P_f$ which is non-inertial and a moving $B_f$ which is inertial whether the ring is fixed or moving. The resulting $M_f$ blinks at 10 MHz, but otherwise behaves the same, i.e. it moves in the direction of motion of the instrument as viewed by an offboard observer, and FIG. 8 works the same. Note that inertial does not mean fixed. It means unaffected by ring motion, i.e. it is "unstuck".

Figure 9:
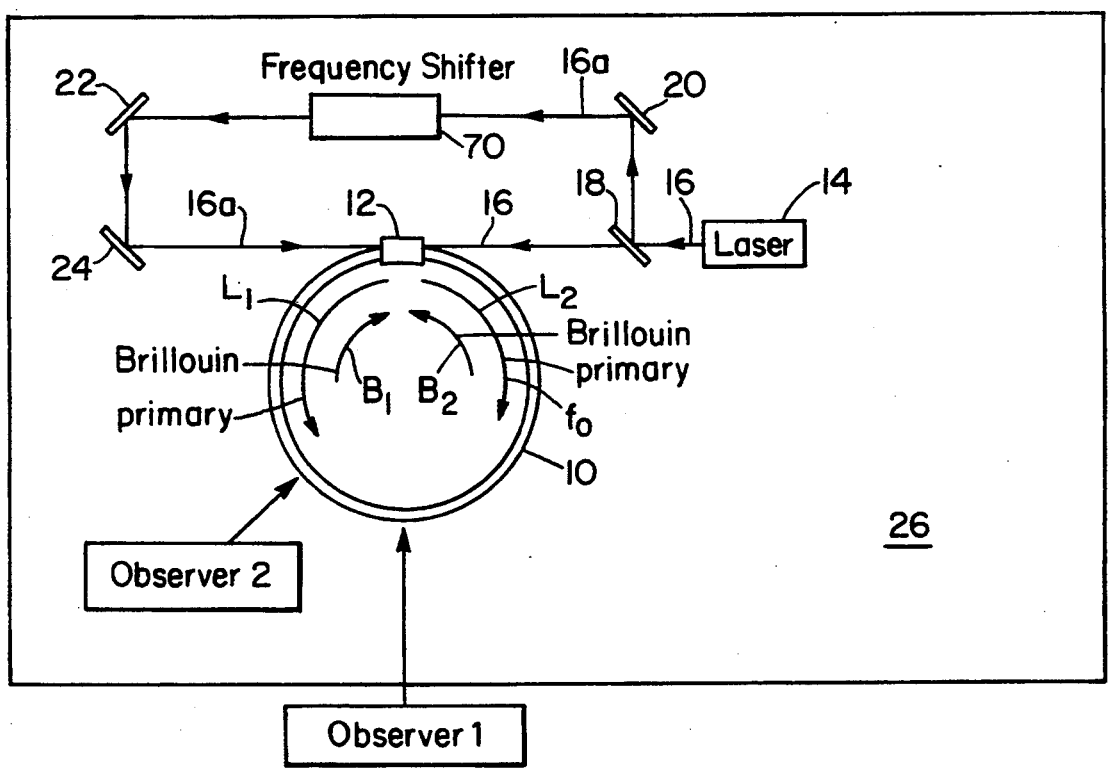
FIG. 9 is a schematic diagram of a laser driven optical waveguide similar to that of FIG. 1 including a frequency shifter to separate the primary wave frequencies and prevent backscattering coupling of the Brillouin waves.

A system to overcome this problem is illustrated in FIG. 9, which is virtually identical to the system shown in FIG. 1 with the exception that a frequency shifter 70 is inserted in beam 16a so that the proper frequency separation can be introduced between the primary waves $L_1$ and $L_2$.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A scattered light Moire-Brillouin guided wave gyroscope, comprising:
   a coherent light source for providing two counter-rotating primary waves;
   an optical waveguide, responsive to said two primary waves, for generating a Moire fringe from a primary fringe and a Brillouin fringe derived, respectively, from the counter-rotating primary waves and from the counter-rotating Brillouin waves produced from the primary waves; and
   means for detecting the rotation of said Moire fringe relative to said waveguide.

2. The scattered light, Moire-Brillouin guided wave optical gyroscope of claim 1 in which said primary waves are of the same frequency.

3. The scattered light, Moire-Brillouin guided wave optical gyroscope of claim 2 in which said Brillouin fringe and said primary fringe are stationary in the rest position.

4. The scattered light, Moire-Brillouin guided wave optical gyroscope of claim 1 in which said primary waves are separated in frequency by a multiple of the free spectral range of the waveguide.

5. The scattered light, Moire-Brillouin guided wave optical gyroscope of claim 4 in which said Brillouin fringe and said primary fringe are moving in the rest position.

6. The scattered light, Moire-Brillouin guided wave optical gyroscope of claim 1 in which said coherent light source is a laser.

7. The scattered light, Moire-Brillouin guided wave optical gyroscope of claim 6 in which said laser is a solid state laser.

8. The scattered light, Moire-Brillouin guided wave optical gyroscope of claim 1 in which said optical waveguide is a fiber optic element.

9. The scattered light, Moire-Brillouin guided wave optical gyroscope of claim 1 in which said means for detecting includes sensor means proximate the side of said waveguide for sensing a shift in said Moire fringe relative to said waveguide.

10. The scattered light, Moire-Brillouin guided wave optical gyroscope of claim 1 in which said means for detecting includes a plurality of sensors disposed proximate the side of said waveguide for sensing relative motion of said Moire fringe.

11. The scattered light, Moire-Brillouin guided wave optical gyroscope of claim 10 in which said sensors extend along said waveguide for monitoring a plurality of fringes of the Moire fringe.

12. The scattered light, Moire-Brillouin guided wave optical gyroscope of claim 11 in which there are a number of sensors disposed adjacent each Moire fringe pattern cycle along said waveguide.

13. The scattered light, Moire-Brillouin guided wave optical gyroscope of claim 10 in which said sensors include an array of CCDs.

14. The scattered light, Moire-Brillouin guided wave optical gyroscope of claim 1 in which said means for detecting includes means for determining the magnitude of the motion of the Moire fringe relative to said waveguide.

15. The scattered light, Moire-Brillouin guided wave optical gyroscope of claim 14 in which said means for detecting includes means for determining the direction of relative motion between said waveguide and said Moire fringe.

16. The scattered light, Moire-Brillouin guided wave optical gyroscope of claim 1 in which said light source includes a single laser.

17. The scattered light, Moire-Brillouin guided wave optical gyroscope of claim 16 in which said light source includes a frequency shifter means for separating said primary waves by a multiple of the free spectral range of the waveguide.

* * * * *